June 14, 1966 F. ADLER 3,256,476
GENERATOR POLARIZING MEANS
Filed Jan. 17, 1963 3 Sheets-Sheet 1

INVENTOR.
FRED ADLER
BY
*Kenyon & Kenyon*
ATTORNEYS

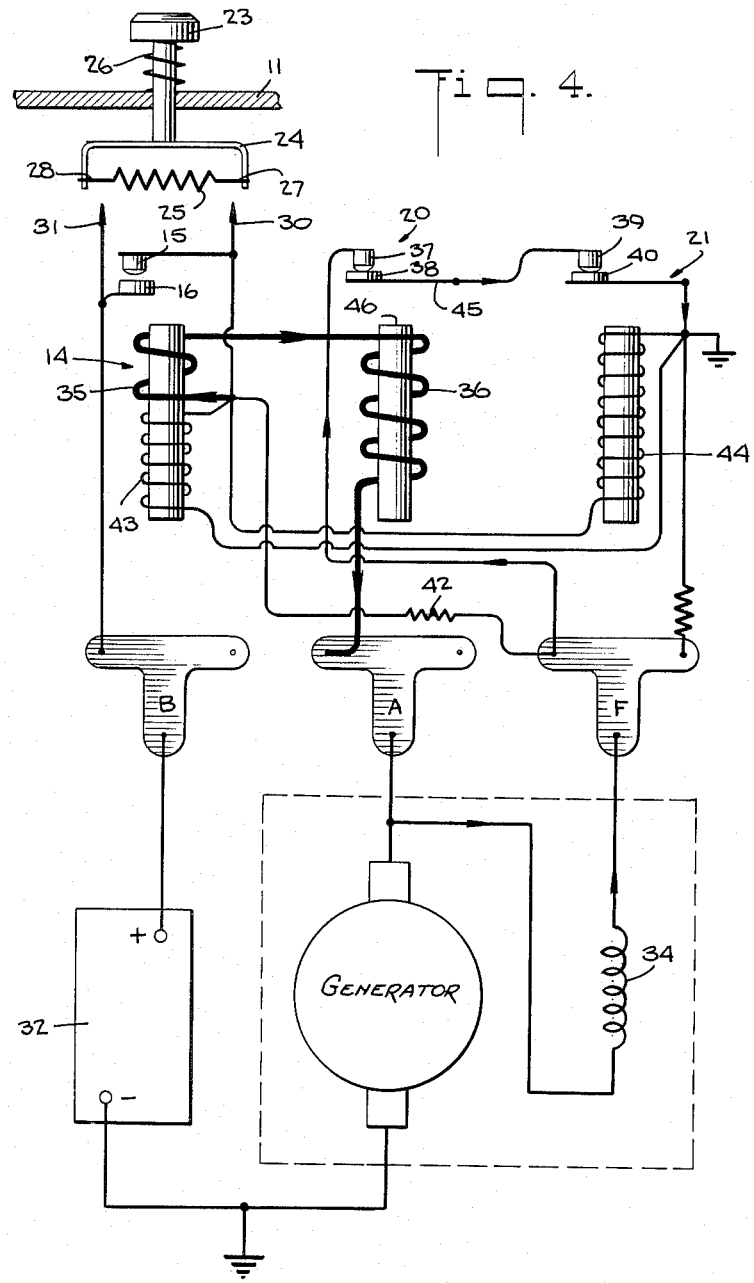

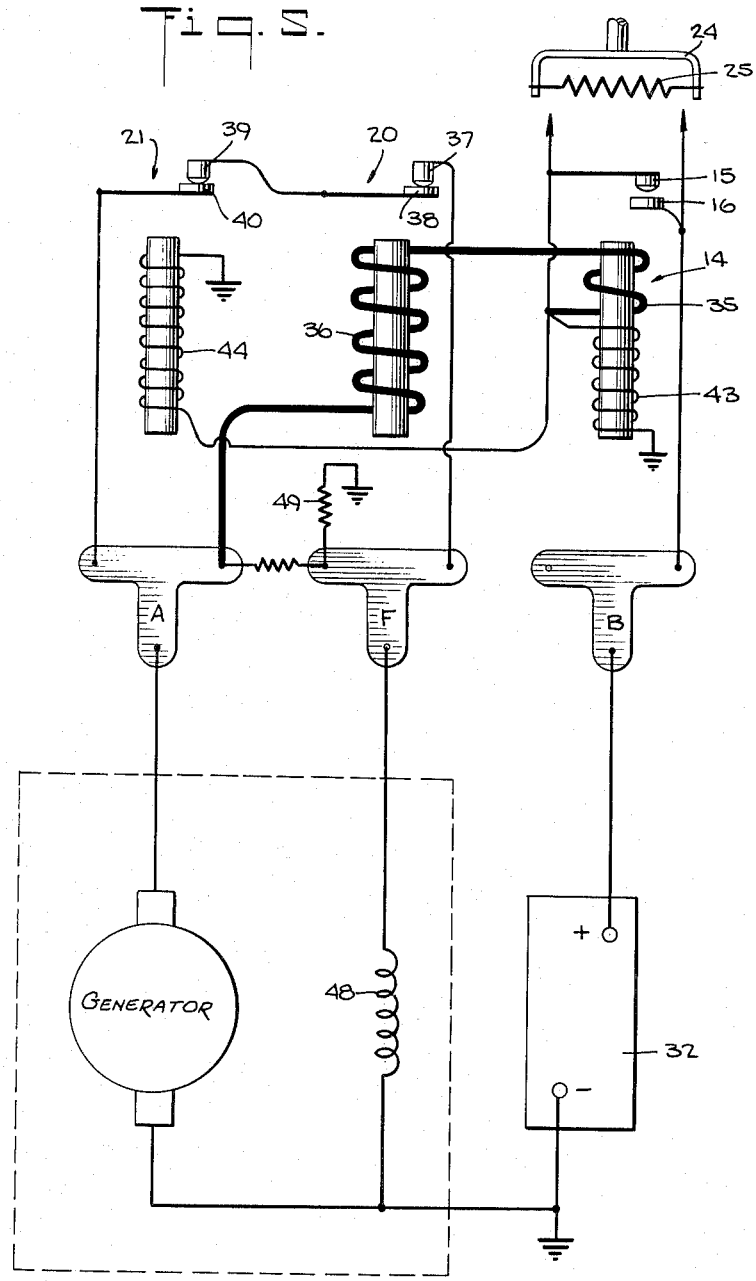

United States Patent Office 3,256,476
Patented June 14, 1966

3,256,476
GENERATOR POLARIZING MEANS
Fred Adler, Westbury, N.Y., assignor to Standard Motor Products, Inc., New York, N.Y., a corporation of New York
Filed Jan. 17, 1963, Ser. No. 252,137
6 Claims. (Cl. 322—60)

This invention relates to the means for polarizing generators and more particularly to means associated with the voltage regulator for insuring the correct polarization of the field of an automotive generator with respect to the battery.

One of the most serious difficulties which has been found in the connection with installation of new generators or voltage regulators in motor vehicles has been the failure to polarize properly the field of the generator with respect to the battery. When the field is not properly polarized, arcing, oxidation and rapid deterioration of the voltage regulator's relay contacts results. It has been reliably estimated that 35% of all returns on voltage regulators are the result of the mechanic's failure to properly polarize the generator field. Improper operation of the voltage regulator results in a situation which usually leads to damage to the battery generator, wiring and electrical accessories.

In previous practice, generators have been polarized by using either one of two methods depending primarily upon the way in which the generator is grounded. With an externally grounded field circuit in a generator it has been the practice for the mechanic to manually use a jumper lead, to connect the battery terminal and armature terminal of the generator or the voltage regulator for a short period of time permitting a surge of current through the generator's field winding which results in a proper polarization of the field. This results in shorting out the cutout relay and if properly done, correctly polarizes the generator with respect to the battery. However, if improperly done either no effect is had or if the polarity of the generator is reversed the difficulties mentioned above occur. In view of the number of different voltage regulators available and the untrained nature of mechanics there is a serious risk that the jumper lead will not be properly employed and the correct polarization will not result.

In the case of generators which have an internally grounded field it has been the practice to disconnect the ungrounded lead, which would be the lead to the armature terminal of the voltage regulator, and manually touch it to the battery terminal of the regulator for a brief moment and then to reconnect it to the armature terminal. This has the same effect as the above procedure in that it permits a brief surge of current from the battery to correctly polarize the field by passing current in the proper direction through the field windings of the generator. This method is of course subject to the same serious disadvantages and hazards as described above in connection with the externally grounded generator.

Both prior art methods and means for assuring proper generator polarity are cumbersome, inefficient and uncertain, with serious consequences if not properly done.

It is therefore an object of this invention to provide an improved means for correctly polarizing the field of a motor vehicle generator.

It is a further object to provide means associated with the voltage regulator to polarize properly the field of the generator.

More particularly, it is an object of this invention to provide a push-button device in connection with a voltage regulator which when operated will always insure that the field of the generator is properly polarized with respect to the battery.

The device for insuring proper polarization of the field of a generator of this invention is briefly as follows: A push-button is connected to the cover of a voltage regulator of any standard type. Means associated with the push-button are arranged to insure that the correct connection between the terminals of the voltage regulator is made when the push-button is depressed so that a surge of current from the battery through the field windings of the generator will always correctly polarize the generator. Two embodiments of this invention are disclosed and will be described hereinbelow.

Both forms involve the use of the internal circuitry of a standard voltage regulator to properly apply the battery voltage to a field of a generator. In both embodiments a special resistor is carried by an insulation plate that is in turn mounted on the push-button. When the push-button is depressed, the special resistor is brought down to contact two terminals that span the normally open cutout relay contacts. In this fashion, the special resistor bridges the normally open cutout relay contacts and causes a surge of current to be applied to the proper field terminal through the internal circuitry of the regulator.

The two embodiments shown cover an internally grounded field and an externally grounded field but the structure and operation of the invention are similar.

The special resistor is one that has a very low initial resistance to permit a large initial surge of current. The resistor, however, rapidly increases its resistance as current flows through it. The resistor thus permits an initial polarizing surge of current which is immediately cut back so that the operator cannot burn out the resistor or drain the battery by inadvertently holding down the push-button for any considerable length of time.

Other objects and features of this invention will become more apparent from the detailed description which follows below and a consideration of the drawings, wherein:

FIG. 4 is a circuit diagram illustrating the application of this invention to an externally grounded generator; and FIG. 5 is a circuit diagram illustrating the application of this invention to an internally grounded generator.

Figure 1:
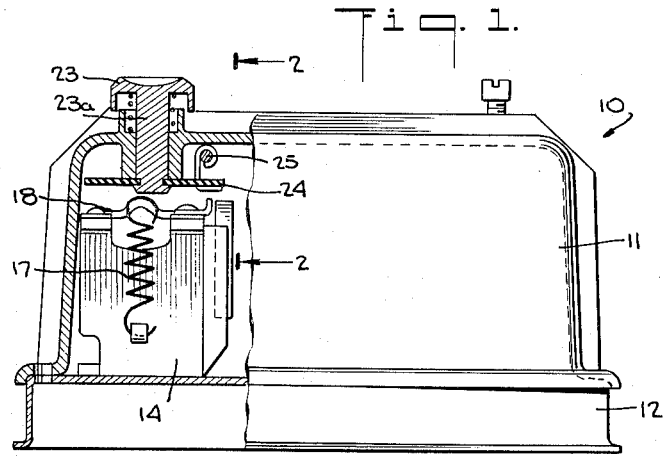
FIG. 1 is an elevation view of a standard voltage regulator with a cut-away portion illustrating this invention.
Figure 2:
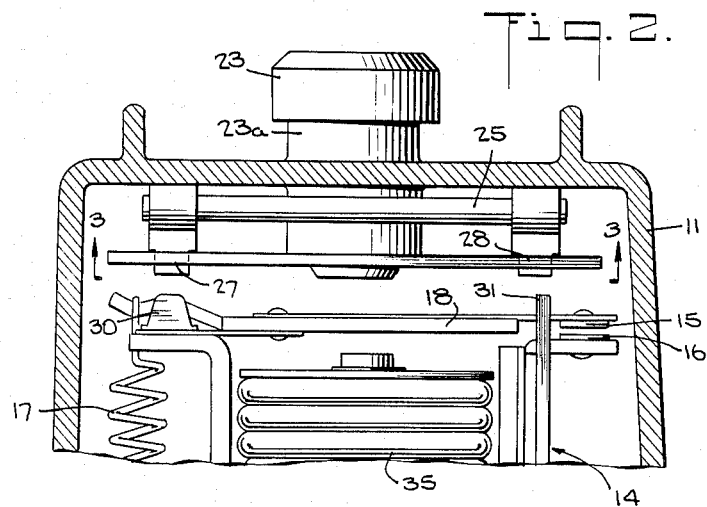
FIG. 2 is a section along the plane 2—2 in FIG. 1 illustrating the relationship between the structure added by this invention and the cutout relay in the regulator.
Figure 3:
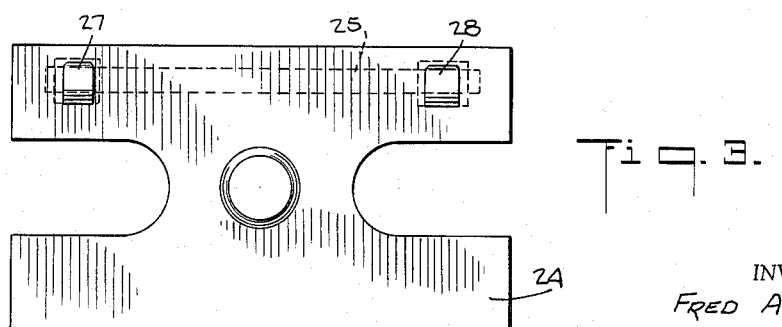
FIG. 3 is a view along the plane 3—3 in FIG. 2 insulation plate that carries the special resistor and is mounted on the push-button.

FIG. 1 illustrates a fairly standard voltage regulator 10 which has the usual housing 11 mounted on a base 12. The cut-away portion of the housing 11 shows a back view of the cutout relay 14. As may be seen in better detail in FIG. 2, the armature contact 15 is held in a normally open position with respect to the fixed contact 16 by means of a spring 17 loading of the armature 18.

The usual current regulator relay 20 and voltage relay 21 are hidden by the cover 11 and are shown schematically in FIGS. 4 and 5.

The novel features of the illustrated regulator 10 include a push-button 23 which is connected to an insulating mounting plate 24 on which plate 24 there is mounted a resistor 25. The push-button 23 is spring 26 loaded so that the push-button 23, the insulating plate 24 and the resistor 25 are normally out of contact with the cutout relay 14. The push-button 23 is mounted outside the cover 11 and connected to the insulating plate 24 by a rod portion 23a.

When an operator depresses the push-button 23, the plate 24 is lowered until two contacts 27 and 28 on the plate 24 hit against the cutout relay 14. The contact 27 is so located on the insulating plate 24 that when the plate 24 is depressed the contact 27 makes an electrical connection with the armature contact 15 and the insulating plate 24 contact 28 makes an electrical connection with the fixed contact 16. The resistor 25 is electrically connected to the insulating plates contacts 27 and 28 so that when the push-button 23 is depressed an electrical circuit is completed from the armature contact 15, through the resistor 25 to the fixed contact 16. This electrical connection is schematically illustrated in FIGS. 4 and 5.

A standard voltage regulator with a standard cutout relay 14 may be adapted to this invention by providing a bent washer 30 (see FIG. 2) which is permanently electrically connected to the armature contact 15, to serve as the electrical contact with the insulating plate 24 contact 27 when the plate 24 is depressed. Similarly, a tab 31 may be provided which is permanently electrically connected to the fixed contact 16 to serve as the electrical contact with the insulating plate 24 contact 28 when the plate 24 is depressed. Clearly, the means by which the resistor 25 is brought into the proper electrical contact with the contacts 15, 16 when the push-button 23 is depressed may vary widely and the bent washer 30, tab 31 expedient is but one example.

The generators in use for which a voltage regulator is needed, may be either internally grounded or externally grounded. The voltage regulator connections will be somewhat different depending upon whether the regulator 10 is used in conjunction with an internally grounded generator or in conjunction with an externally grounded generator. However, the structure of this invention is equally applicable to both types of generator-regulator situations. FIG. 4 may be used to illustrate the working of this invention in conjunction with an externally grounded generator and FIG. 5 may be used to explain the working of this invention in conjunction with an internally grounded generator.

In FIG. 4, when the button 23 is not depressed, the regulator with its cutout relay 14, current control relay 20, and voltage control relay 21, operates in the usual fashion.

When the push-button 23 is depressed, a surge of current will flow from the battery 32 through the generator field 34 to ground and such current will flow in the proper direction to polarize the field 34. In detail, the path of the current will be from the positive terminal of the battery 32 through the regulator battery terminal B, the resistor 25, the low resistance coil 35 of the cutout relay 14, the low resistance coil 36 of the current control relay 20, the regulator armature terminal A, the generator field 34, the regulator field F, the normally closed contacts 37, 38 of the current control relay 20, and the normally closed contacts 39, 40 of the voltage control relay 21, and finally to ground or the negative terminal of the battery 32.

The resistance of the field 34 is sufficiently less than that of the resistor 42, or of the resistance of the high resistance coil 43 of the cutout relay 14, or of the resistance of the high resistance coil 44 of the voltage control relay 21 so that the bulk of the surge current will be fed through the field 34. The current control relay 20 contacts 37, 38 will not open while the polarizing current is flowing through the low resistance coil 36 because the magnitude of that polarizing current, limited by the resistance of the field 34, is inadequate to cause the armature 45 on which the contact 38 is mounted, to be attracted to the pole face 46.

In the FIG. 4 embodiment, as well as in the FIG. 5 embodiment, the resistor 25 is preferably at a very low value for a short period of time during which the initial polarizing current is applied to the field windings 34. Since the period of time during which the push-button 23 remains depressed is a function of the operator, it is desirable to maintain a safety feature which will prevent either burning out the resistor 25 or draining the battery 32 in case the push-button 23 is left depressed for an undue period of time. Accordingly, it is important that the resistor 25 be of the type which rapidly increases its resistance following the initial surge of current. In one embodiment, the resistor 25 was selected so that the initial current surge was as high as 20 amperes, but after a period of one-tenth of a second the resistance of the resistor 25 increased to a point where the amperage dropped to about 8 amperes.

FIG. 5 illustrates the working of this invention in conjunction with a regulator that is connected to a generator having an internally grounded field. The reference numerals used in FIG. 4 will be used in FIG. 5 for comparable parts.

When the resistor 25 is placed across the cutout relay 14 terminals 15 and 16, a surge of current flows from the positive terminal of the battery 32 through the internally grounded field 48 of the generator to return to the grounded negative terminal of the battery 32. In particular, the current flow is from the positive terminal of the battery 32 through the regulator battery terminal B, the resistor 25, the low resistance coil 35 of the cutout 14, the low resistance coil 36 of the current control relay 20, the regulator armature terminal A, the normally closed contacts 39, 40 of the voltage control relay 21, the normally closed contacts 37, 38 of the current control relay 20, the regulator field terminal F, the generator field 48, and finally back to the battery 32 through ground.

The resistance of the field 48 is sufficiently less than that of the high resistance coil 43 of the cutout relay 14, or the high resistance coil 44 of the voltage control relay 21, or of the resistor 49 so that the bulk of the surge current passes through the field windings 48 causing the field windings 48 to become properly polarized.

From the above description it can be seen that both embodiments provide a fool-proof way of insuring proper polarization of the field of a generator. The operation of the device of this invention is simple and effective. Because the device of this invention provides for the correct connection to be made between the terminals of the voltage regulator it permits any mechanic to insure that the generator's field will not be improperly polarized with respect to the battery.

The push-button devices described above are provided as integral portions of the voltage regulators. Thus, a single operation by the mechanic will eliminate the need for his understanding of the internal circuitry of the electrical system of the battery, voltage regulator and generator in order to insure proper installation of a new battery regulator or generator. By the one simple operation of depressing the push-button, proper polarization will be assured. This will effectively eliminate the problems described above and will materially increase the life and efficiency of the voltage regulator.

While two embodiments of this invention have been illustrated and described, it will be appreciated by those skilled in the art that other voltage regulators can be modified in a like way to make use of the device of this invention.

What is claimed is:

1. In a voltage regulator having a cover and cut-out relay with normally open contacts within said cover, one of said contacts being electrically connected to the battery terminal of said regulator, a means for polarizing the field of the generator to be connected to said regulator comprising:

a spring loaded normally retracted externally mounted push-button having a stem extending through said cover, and an internally mounted resistor mechanically mounted to said push-button stem, the terminals of said resistor being so positioned within said regulator that while said push-button is held depressed, said resistor will shunt said normally open contacts of said cut-out relay.

2. In a voltage regulator having a cover and cut-out relay with normally open contacts within said cover, one of said contacts being electrically connected to the battery terminal of said regulator, a means for polarizing the field of the generator to be connected to said regulator comprising:
  an externally mounted spring loaded push-button having an actuated position and an unactuated position, said push-button being spring loaded so that it can be kept in said actuated position only while actuating force is applied thereto and so that said push-button will be in said unactuated position whenever actuating force is not present, said push-button including a stem extending through said cover, and
  an internally mounted resistor mechanically mounted to said push-button stem, the terminals of said resistor being so positioned within said regulator that when said push-button is actuated said resistor will shunt said normally open contacts of said cut-out relay.

3. In a voltage regulator having a cut-out relay with normally open contacts, one of said contacts being electrically connected to the battery terminal of said regulator, the improvement comprising:
  a resistor, and
  push-button means connected to said resistor to place said resistor across said normally open contacts of said cut-out relay when said means is actuated, said resistor having the characteristic of a relatively low cold resistance which increases rapidly in magnitude as current flows through said resistor.

4. In a voltage regulator having a cover and cut-out relay with normally open contacts within said cover, one of said contacts being electrically connected to the battery terminal of said regulator, a means for polarizing the field of the generator to be connected to said regulator comprising:
  an externally mounted push-button having a stem extending through said cover, and
  an internally mounted resistor mechanically mounted to said push-button stem, the terminals of said resistor being so positioned within said regulator that when said push-button is actuated said resistor will shunt said normally open contacts of said cut-out relay, said resistor having a high temperature coefficient of resistivity.

5. In a voltage regulator having a cover and a cut-out relay with normally open contacts within said cover, polarizing means for polarizing the field of the generator to be connected to said regulator with respect to the battery to be connected to said regulator comprising:
  a normally retracted push-button carried externally of said cover and having a rod portion extending to within said cover,
  a resistor mounted on said rod portion, said resistor having a first terminal and a second terminal, said resistor having a relatively high thermal coefficient of resistivity,
  a first terminal on said cut-out relay electrically connected to one of said normally open contacts of said cut-out relay and disposed opposite said first terminal of said resistor, and
  a second terminal on said cut-out relay electrically connected to a second one of said normally open contacts of said cut-out relay and disposed opposite said second terminal of said resistor,
  whereby the depression of said retractable push-button will cause said resistor to shunt said normally open contacts of said cut-out relay.

6. In the electrical circuit of a motor vehicle having a battery, a generator and a voltage regulator, wherein said voltage regulator includes a cover and a normally open cut-out relay mounted within said cover, and wherein said battery is connected to a battery terminal of said regulator and the field of said generator is connected to a field terminal of said regulator, the improvement being a polarizing means for polarizing the field of said generator with respect to said battery, comprising:
  a retractable push-button carried externally on said cover and having a rod portion thereof extending within said cover,
  an insulating member mounted on said rod portion,
  a resistor mounted on said insulating member, said resistor having a first terminal and a second terminal, said resistor having the characteristic of a relatively low initial resistance which increases rapidly in magnitude as current flows through said resistor,
  a third terminal electrically connected to a first one of said normally open contacts of said cut-out relay, said third terminal being disposed opposite said first terminal of said resistor, and
  a fourth terminal electrically connected to a second one of said normally open contacts of said cut-out relay, said fourth terminal being disposed opposite said second terminal of said resistor,
  whereby the depression of said retractable push-button will cause said resistor to shunt said normally open contacts.

References Cited by the Examiner
UNITED STATES PATENTS

| 2,502,098 | 3/1950 | Lindfors | 322—88 |
| 2,746,004 | 6/1956 | Gartner | 322—6 |
| 3,029,377 | 4/1962 | Schaible | 307—100 |

LLOYD McCOLLUM, *Primary Examiner.*

A. H. TISCHER, *Assistant Examiner.*